United States Patent [19]

Dorren

[11] 3,798,377

[45] Mar. 19, 1974

[54] FOUR CHANNEL FM DECODER UTILIZING A ONE-OF-FOUR DECODER

[75] Inventor: Louis Dorren, Milbrae, Calif.

[73] Assignee: Matsushita Electric Corporation of America, New York, N.Y.

[22] Filed: Apr. 7, 1972

[21] Appl. No.: 242,073

[52] U.S. Cl. .......... 179/15 BT
[51] Int. Cl. .......... H04h 5/00
[58] Field of Search .......... 179/15 BT; 329/122, 110; 325/112, 329

[56] References Cited

UNITED STATES PATENTS

| | | | |
|---|---|---|---|
| 3,708,623 | 1/1973 | Dorren | 179/15 BT |
| 3,584,154 | 6/1971 | McShan | 179/15 BT |
| 3,283,079 | 11/1966 | Dixon | 179/15 BT |

OTHER PUBLICATIONS

On An Inductorless FM Stereo Multiplex Circuit Using A Phase-Locked Loop IEEE X-actions on Broadcast & Television Receivers, Nov. 1970, p. 281–288.

*Primary Examiner*—Kathleen H. Claffy
*Assistant Examiner*—Thomas D'Amico
*Attorney, Agent, or Firm*—Robert G. Slick

[57] ABSTRACT

A four channel FM system decoder wherein the usual 19 kHz pilot signal actuates a phase lock loop circuit, said phase lock loop circuit actuating a one-of-four decoder and quadraplex gate to switch an FM composite signal containing four information elements to extract each of the elements separately.

3 Claims, 4 Drawing Figures

FOUR CHANNEL FM DECODER UTILIZING A ONE-OF-FOUR DECODER

SUMMARY OF THE INVENTION

The present invention relates to an improvement on the invention in my patent application Ser. No. 32,989 filed Apr. 29, 1970 now U.S. Pat. No. 3,708,623 which is a continuation-in-part of my application Ser. No. 13,902 filed Feb. 25, 1970, now abandoned. In said patent application a novel system is described for providing a four channel or quadraplex FM system which is fully compatible with existing FM mono and stero equipment. According to a preferred embodiment in this disclosure, a main channel is provided which extends from 50 Hz to 15 kHz, containing the sum of all four elements of the information, a 19 kHz pilot, a first subchannel centered at 38 kHz containing two carriers in quadrature, the sine carrier containing (LF+LR−RF−RR) and the cosine carrier containing (LF−LR−RF+RR) and a second subchannel centered at 76 kHz containing (LF−LR+RF−RR) information. Such a signal can be demodulated by taking the 19 kHz pilot, doubling it to provide a 38 kHz signal which is used to switch between the left and right information and doubling it again to provide a 76 kHz switching signal which is used to extract the front from the rear information.

The present invention is an improvement in the decoding system previously described in that it uses a phase lock loop circuit to generate the switching signals. Phase lock loop circuits have been developed to the point where the whole circuit can be placed on a single chip, providing a very simple and inexpensive substitute for the doubler circuits previously used. Further, the results are positive and there is a freedom from noise.

DESCRIPTION OF THE PREFERRED EMBODIMENTS

Figures 1, 4:
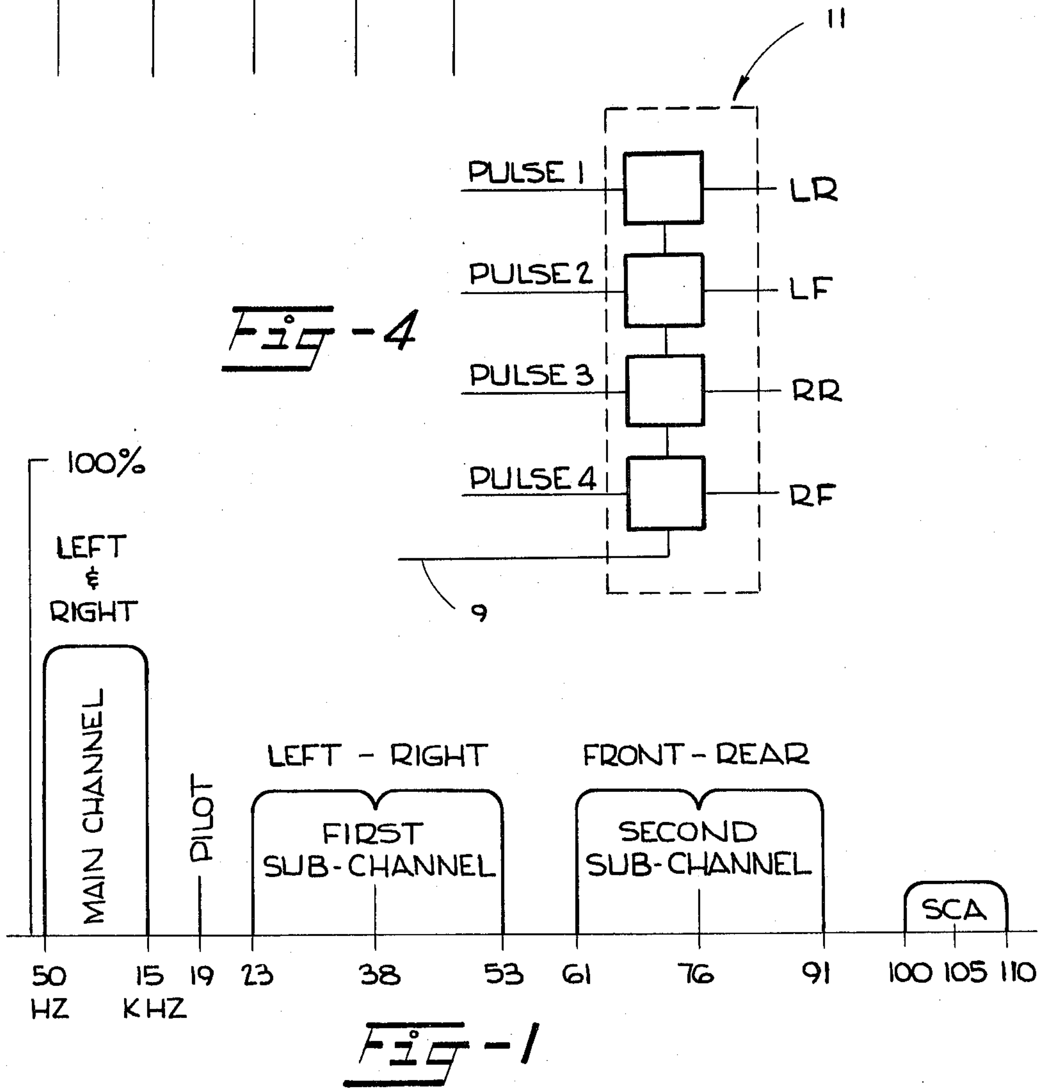
FIG. 1 is a representation of a four channel FM system to which the present invention is primarily applicable.
FIG. 4 is a switch analogy of the decoding process.

The composite signal which is handled in accordance with the present invention is shown in FIG. 1. In connection with this and the following description the terms "left and right" and "front and back" are used to describe the four signals but it will be understood that the signals are not necessarily sent in this order and that the channels could be as easily numbered 1, 2, 3, and 4 and that calling the signals by these names is merely for the purpose of simplifying the discussion.

The signal itself consists of a main channel going from 50 Hz to 15 kHz from the carrier frequency and this main channel carries all four signals and is the one which would normally be received by a mono receiver. The usual 19 kHz pilot signal is provided and above this is a first subchannel centered at 38 kHz containing two subcarriers in quadrature of which the first carrier contains the (LF+LR−RF−RR). In normal stereo systems the main channel and the first subchannel subcarrier would be demodulated to provide the usual stereo information. A second subchannel centered at 76 kHz is provided containing the (LF−LR+RF−RR) information and in the case of a quadraplex receiver this, in conjunction with the two subcarriers in the first subchannel and the main channel information enables one to receive all four channels.

Figure 2:
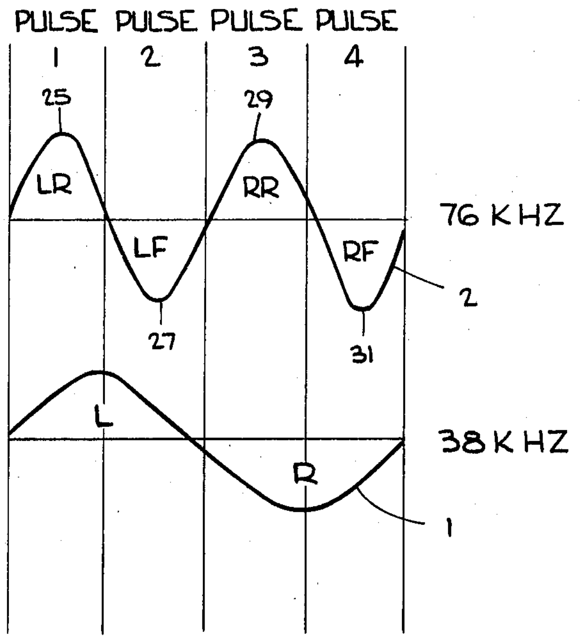
FIG. 2 is a diagram showing the system by which the signal is decoded.

In FIG. 2 the decoding system is shown wherein curve 1 represents one complete cycle of the first subchannel which has a center frequency of 38 kHz. Curve 2 represents the second subchannel which is centered at 76 kHz. During the first half cycle of 76 kHz, the left rear channel would be transmitted. During the second half cycle the left front would be transmitted. At this time the 38 kHz now starts its second half cycle. The 76 kHz subcarrier now starts its second cycle in which the first half cycle of the right rear is transmitted and in the second half cycle the right rear is transmitted. It is obvious to see that if proper proportions of the main channel, first subcarrier, second subcarrier and third subcarrier are mixed, the switching action described above is accomplished.

Figure 3:
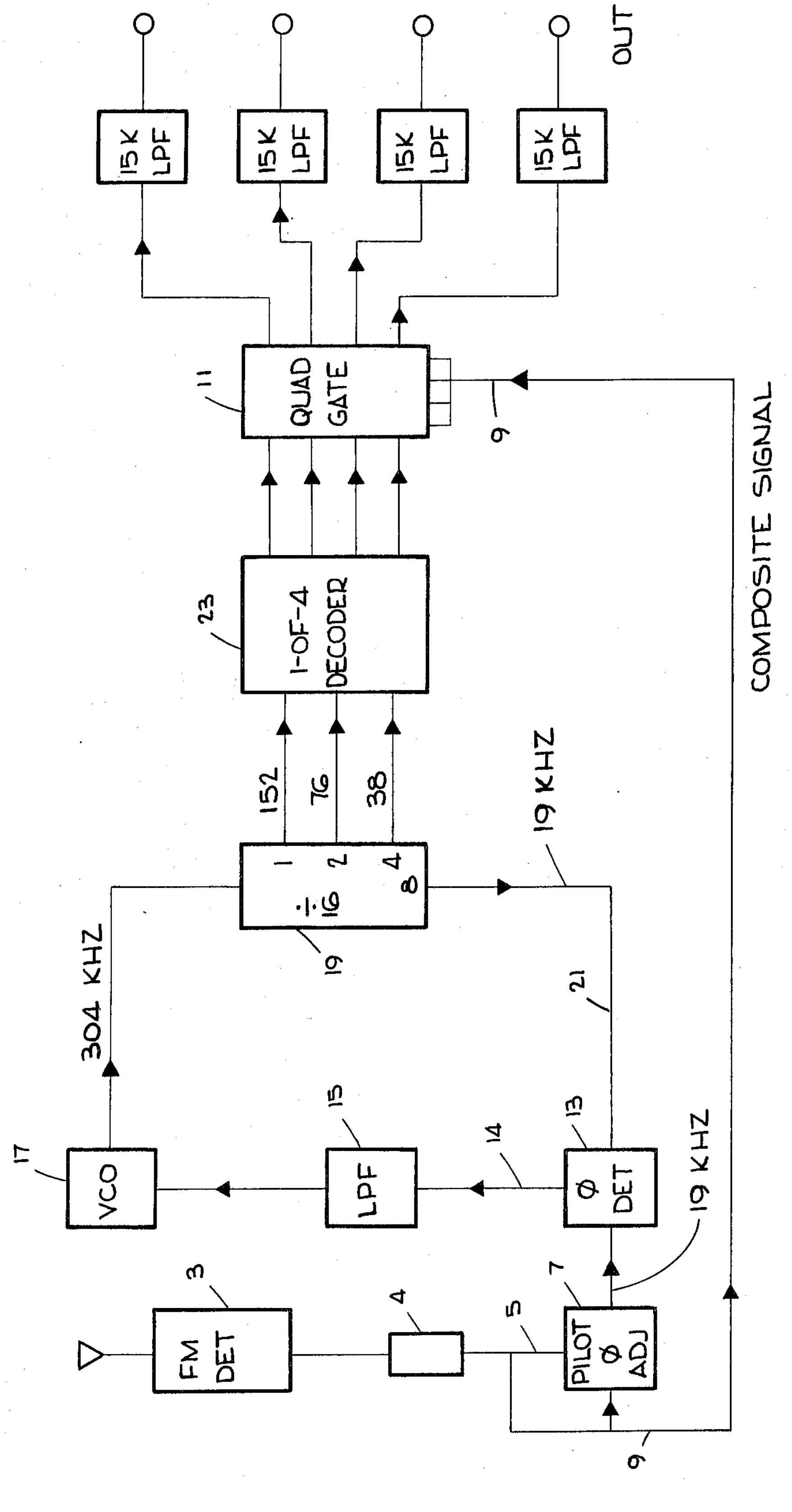
FIG. 3 is a block diagram of a complete four channel decoder utilizing the phase lock loop circuit of the present invention.

The system by which this information is extracted in accordance with the present invention is shown in FIG. 3. Here the composite signal from the FM detector 3 is passed through an emitter follower 4 for impedance transformation and buffering. The signal is then split, a portion being sent through line 5 to a pilot phase adjust circuit 7 and a portion going through line 9 to the quadraplex gate 11, described hereinafter.

The pilot phase adjustment circuit adjusts the pilot signal to obtain proper synchronization for maximum separation. This produces a clean 19 kHz pilot signal. This signal is passed to the phase detector 13 which forms part of a phase lock loop constituting the phase detector 13, a low pass filter 15, a voltage controlled oscillator 17 and a binary counter 19 which divides the frequency by 16. The voltage controlled oscillator 17 has a free running frequency of approximately 304 kHz and if there is a difference in phase between the output of the voltage controlled oscillator and the pilot signal, an error signal is produced. The error signal is fed through line 14 back to the voltage controlled oscillator and thus any changes in the frequency of the incoming signal are sensed at the detector and the error voltage readjusted to maintain the frequency of the VCO so that it remains locked to a multiple of the pilot signal. This locks the loop so that the frequency of the voltage controlled oscillator is maintained precisely at 16 times that of the pilot signal, i.e., 304 kHz.

The binary divider circuit 19 divides by 16, the 1, 2, and 4 outputs having frequencies of 152, 76, and 38 kHz, respectively, while the 8 output divides by 16, so that its output is the pilot frequency. The 1, 2, and 4 outputs are fed respectively to the enable, X, and Y inputs of a one of four decoder designated 23, which is a standard hardware item as disclosed in TTL Integrated Circuits Data Book, published by Motorola Semi-Conductor Products, Inc. of May 1971 (MC4300/MC4000 series), MC4007 L, P* describing this decoder by name. This takes the counter output and converts it into a series of pulses which go 1, 2, 3, 4, 1, 2, etc, with a pause equal to one pulse width between each pulse. These pulses are fed into the quadraplex gate 11 together with the composite signal from line 9. These pulses actuate the quadraplex gate whereby the gates turn on in order and one pulse is produced at a 38 kHz repetition rate. Thus, referring back to FIG. 2, pulse 1 of each series would sample the signal at peak 25 to extract the left rear information, the second pulse would sample at peak 27 to extract the left front information, the third pulse at peak 29 to extract the right rear information and the last pulse at peak 31 to extract the right front information. This can be more easily seen in the analogy diagram of FIG. 4 wherein the composite signal is shown being switched by the individual gates.

Now that the signal has been sampled at four successive intervals, the four outputs from the gate 11 can be separately amplified and fed to individual speakers. Preferably a 15 kHz low pass filter is installed in each line to remove any high frequency components.

Although a specific phase lock circuit is shown wherein the voltage controlled oscillator operates at 304 kHz, it will be understood that this is only by way of explanation of how the circuit works and that various frequencies might be selected for decoding various types of signals. For instance, in one embodiment of my invention described in the above identified copending patent application, only a single subcarrier channel is used, centered at 38 kHz. This contains all four channels of information at a repetition rate of 38 kHz rather than the 76 kHz of the system just described. Obviously for decoding a signal at this frequency the signal would be sampled four times during each cycle of the 19 kHz signal rather than four times during the 38 kHz signal.

I claim:

1. A decoder for an FM signal wherein the composite signal has a main channel having first, second, third and fourth information thereon, a pilot signal removed from said main channel, a first subchannel having a frequency twice that of said pilot signal having two carriers in quadrature thereon, namely, a sine carrier containing plus first plus second minus third minus fourth information and a cosine carrier containing plus first minus second minus third plus fourth information thereon and a second subchannel at a frequency twice that of said first subchannel containing plus first minus second plus third minus fourth information thereon, wherein the improvement comprises a phase lock loop circuit in said decoder, said phase lock loop circuit having a free running frequency which is an even multiple of at least eight times that of the pilot signal, passing the output from said phase lock loop circuit through binary dividers to provide three outputs, namely (a) the frequency of said first subchannel, (b) the frequency of said second subchannel and (c) the frequency twice that of said second subchannel, passing said three outputs to a one-of-form decoder to provide a repeating series of four pulses and passing said pulses to first, second, third and fourth gates of a quadraplex gate and utilizing said four gates to switch the incoming composite signal whereby the four incoming information channels are separately derived.

2. The decoder of claim 1 wherein the pilot signal is at 19 KHz, the first subchannel is centered on 38 KHz, the second subchannel is centered on 76 KHz and the phase lock loop circuit includes a voltage controlled oscillator which operates at a frequency of 304 KHz.

3. The decoder of claim 1 wherein a pilot phase adjustment means is provided for adjusting the phase of the signals fed to the 1 of 4 decoder with respect to the phase of the received pilot signal and wherein the one-of-four decoder provides a repeating series of four pulses with a pause between each of said series of pulses which is equal to the pulse width of said pulses and passing said pulses to first, second, third and fourth gates of a quadraplex gate and utilizing said four gates to switch the incoming composite signal wherein by the combined action of the phase adjustment means and the 1 of 4 decoder sampling occurs at the peak of each half cycle of the second subchannel signal and whereby the four incoming information channels are separately derived.

* * * * *